US012598050B2

(12) United States Patent
Abadi

(10) Patent No.: US 12,598,050 B2
(45) Date of Patent: Apr. 7, 2026

(54) TWO-WAY TRANSCEIVER ENCODING FOR SIMULTANEOUS BIDIRECTIONAL SIGNALING

(71) Applicant: NVIDIA Corporation, Santa Clara, CA (US)

(72) Inventor: Ofek Abadi, Nahariya (IL)

(73) Assignee: NVIDIA Corporation, Santa Clara, CA (US)

( * ) Notice: Subject to any disclaimer, the term of this patent is extended or adjusted under 35 U.S.C. 154(b) by 367 days.

(21) Appl. No.: 18/218,848

(22) Filed: Jul. 6, 2023

(65) Prior Publication Data

US 2025/0015966 A1 Jan. 9, 2025

(51) Int. Cl.
H04L 5/14 (2006.01)

(52) U.S. Cl.
CPC .......... H04L 5/1423 (2013.01); H04L 5/1461 (2013.01)

(58) Field of Classification Search
None
See application file for complete search history.

(56) References Cited

U.S. PATENT DOCUMENTS

| | | | | |
|---|---|---|---|---|
| 6,252,526 B1 * | 6/2001 | Uyehara | ............. | G06F 13/4239 341/67 |
| 6,297,986 B1 * | 10/2001 | Jae Kap | ................... | G11C 11/22 365/230.03 |
| 8,018,358 B2 | 9/2011 | Hollis | | |
| 9,219,509 B1 * | 12/2015 | Ware | ......................... | H04B 1/10 |
| 2007/0211794 A1 * | 9/2007 | Dabiri | ...................... | H04B 3/23 375/219 |
| 2008/0069145 A1 * | 3/2008 | Chung | ................ | H04L 25/4915 370/476 |
| 2011/0261863 A1 * | 10/2011 | Chandra | ............... | H04M 9/082 375/219 |
| 2012/0219282 A1 * | 8/2012 | Koganei | ................. | H04L 25/14 398/1 |
| 2017/0244430 A1 * | 8/2017 | Black | ................... | H04B 1/0057 |
| 2021/0243001 A1 * | 8/2021 | Dalmia | ............. | H04L 12/40039 |

(Continued)

OTHER PUBLICATIONS

Nishi et al., "A 0.297-pJ/bit 50.4-GB/s/wire Inverter-Based Short-Reach Simultaneous Bidirectional Transceiver for Die-to-Die Interface in 5nm CMOS," 2022 Symposium on VLSI Technology & Circuits Digest of Technical Papers, pp. 154-155, 2022.

*Primary Examiner* — Lonnie V Sweet
(74) *Attorney, Agent, or Firm* — Lowenstein Sandler LLP

(57) ABSTRACT

A system includes a series of first/second transceivers mutually coupled over data lanes as bidirectional transceivers, and first/second control logic coupled to the first/second transceivers, respectively. An encoding of bit inversions by the first/second control logic causes: first pair of transceivers coupled over a first data lane to transmit non-inverted bits in a first direction and a second direction over the first data lane; second pair of transceivers coupled over a second data lane to transmit inverted bits in a first direction but not a second direction over the second data lane; third pair of transceivers coupled over a third data lane to transmit inverted bits in the second direction but not the first direction over the third data lane; and fourth pair of transceivers coupled over a fourth data lane to transmit inverted bits in the first direction and the second direction over the fourth data lane.

21 Claims, 8 Drawing Sheets

(56)　　　　　References Cited

U.S. PATENT DOCUMENTS

| | | | |
|---|---|---|---|
| 2022/0181050 A1* | 6/2022 | Aoki ..................... | H01C 7/008 |
| 2022/0263686 A1* | 8/2022 | Kons ..................... | H04B 7/063 |
| 2023/0268999 A1* | 8/2023 | Kalman .................. | G02B 6/43 |
| | | | 398/135 |
| 2024/0405878 A1* | 12/2024 | Preuss ................... | H04B 10/40 |

* cited by examiner

300B

400

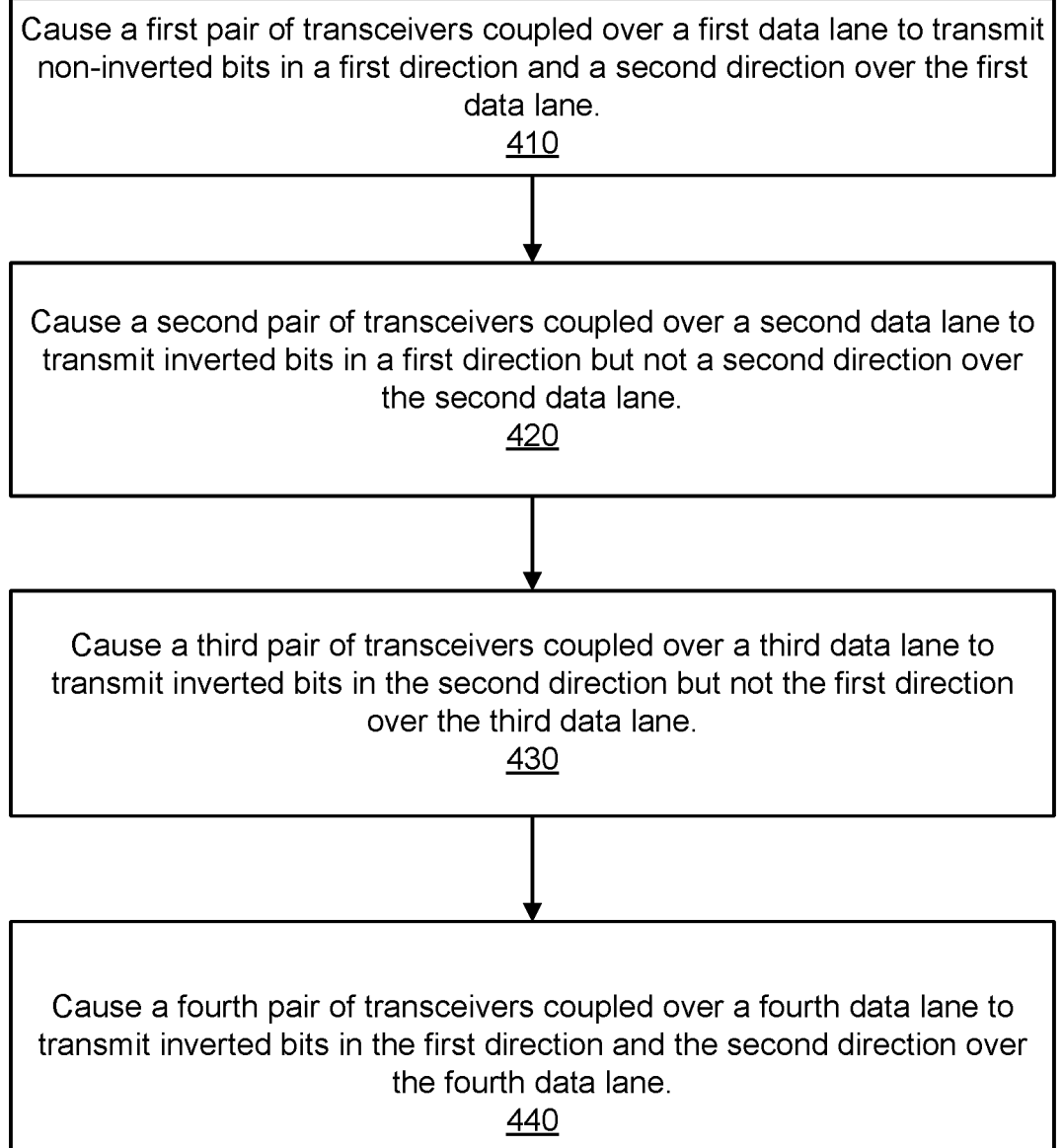

Cause a first pair of transceivers coupled over a first data lane to transmit non-inverted bits in a first direction and a second direction over the first data lane.
410

Cause a second pair of transceivers coupled over a second data lane to transmit inverted bits in a first direction but not a second direction over the second data lane.
420

Cause a third pair of transceivers coupled over a third data lane to transmit inverted bits in the second direction but not the first direction over the third data lane.
430

Cause a fourth pair of transceivers coupled over a fourth data lane to transmit inverted bits in the first direction and the second direction over the fourth data lane.
440

Figures 5A, 5B:
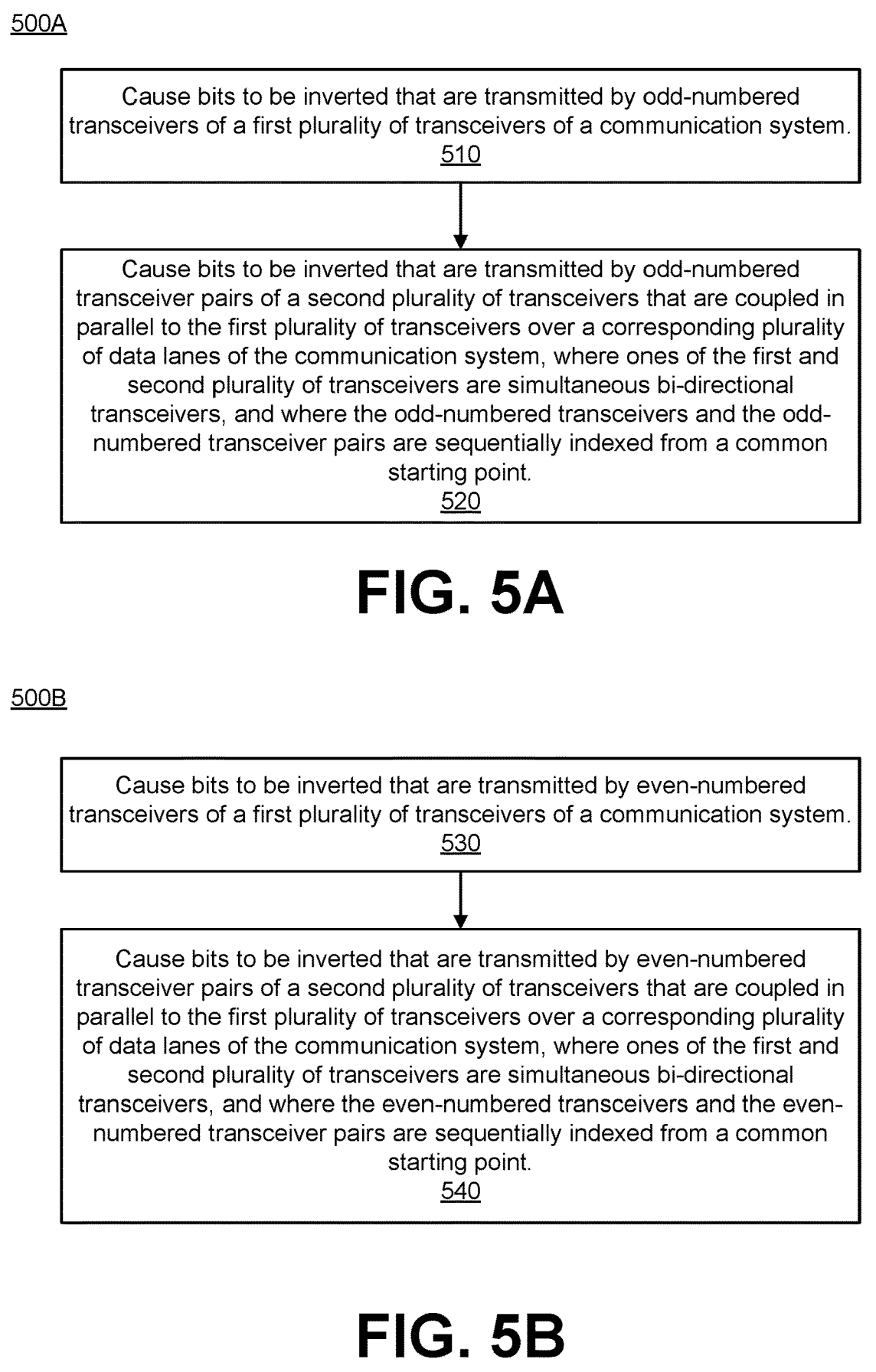

Cause bits to be inverted that are transmitted by odd-numbered transceivers of a first plurality of transceivers of a communication system.
510

Cause bits to be inverted that are transmitted by odd-numbered transceiver pairs of a second plurality of transceivers that are coupled in parallel to the first plurality of transceivers over a corresponding plurality of data lanes of the communication system, where ones of the first and second plurality of transceivers are simultaneous bi-directional transceivers, and where the odd-numbered transceivers and the odd-numbered transceiver pairs are sequentially indexed from a common starting point.
520

Cause bits to be inverted that are transmitted by even-numbered transceivers of a first plurality of transceivers of a communication system.
530

Cause bits to be inverted that are transmitted by even-numbered transceiver pairs of a second plurality of transceivers that are coupled in parallel to the first plurality of transceivers over a corresponding plurality of data lanes of the communication system, where ones of the first and second plurality of transceivers are simultaneous bi-directional transceivers, and where the even-numbered transceivers and the even-numbered transceiver pairs are sequentially indexed from a common starting point.
540

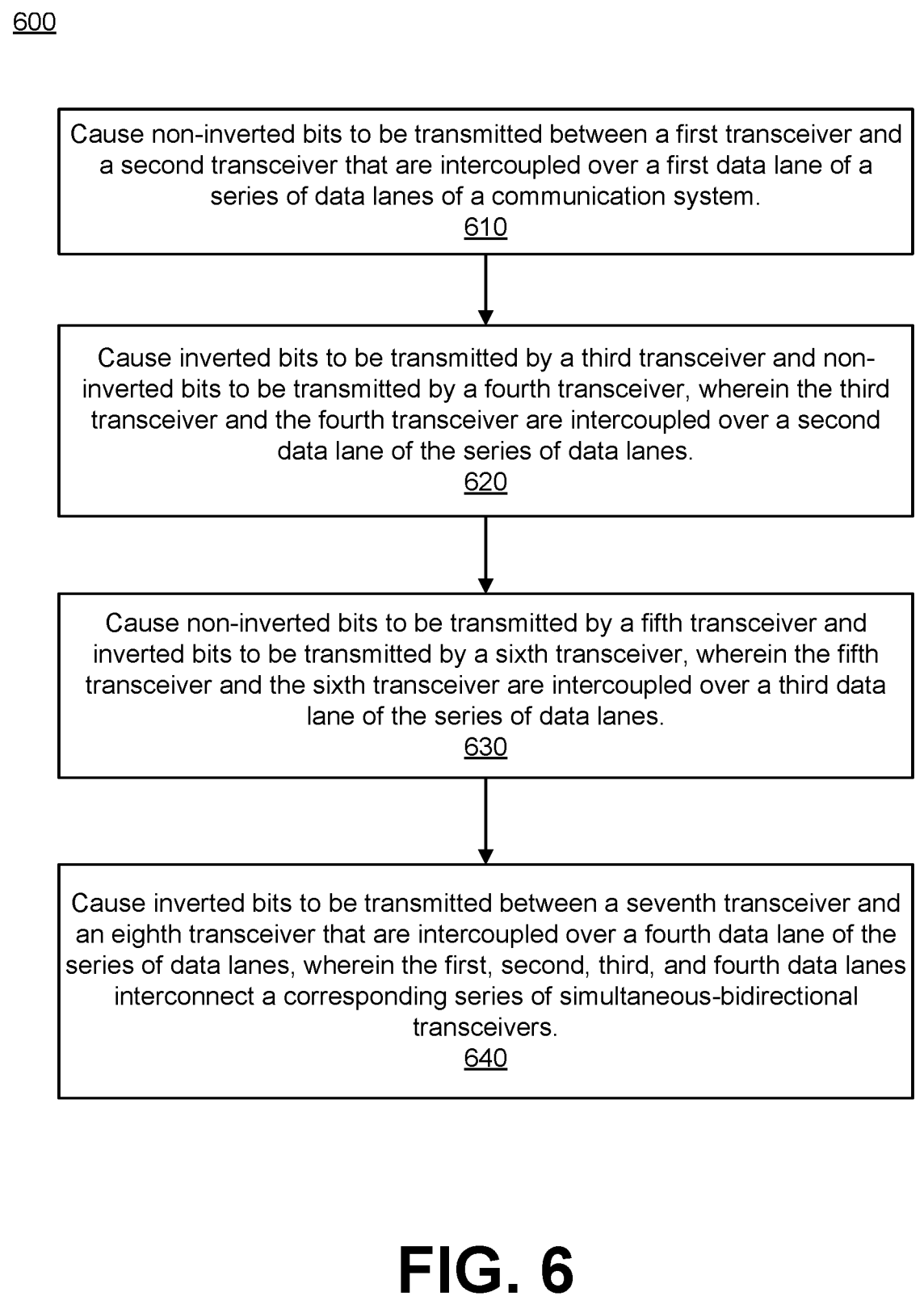

Cause non-inverted bits to be transmitted between a first transceiver and a second transceiver that are intercoupled over a first data lane of a series of data lanes of a communication system.
610

Cause inverted bits to be transmitted by a third transceiver and non-inverted bits to be transmitted by a fourth transceiver, wherein the third transceiver and the fourth transceiver are intercoupled over a second data lane of the series of data lanes.
620

Cause non-inverted bits to be transmitted by a fifth transceiver and inverted bits to be transmitted by a sixth transceiver, wherein the fifth transceiver and the sixth transceiver are intercoupled over a third data lane of the series of data lanes.
630

Cause inverted bits to be transmitted between a seventh transceiver and an eighth transceiver that are intercoupled over a fourth data lane of the series of data lanes, wherein the first, second, third, and fourth data lanes interconnect a corresponding series of simultaneous-bidirectional transceivers.
640

FIG. 6

TWO-WAY TRANSCEIVER ENCODING FOR SIMULTANEOUS BIDIRECTIONAL SIGNALING

TECHNICAL FIELD

At least one embodiment generally pertains to communication systems, and more specifically, but not exclusively, to a two-way transceiver encoding for simultaneous bidirectional signaling to reduce current changes during mode transitions.

BACKGROUND

In parallel interfaces of some communication systems, such as die-to-die and chip-to-chip, there exists a need to increase the data bandwidth-to-area efficiency, e.g., total transmitted bandwidth per total transceiver area, and bandwidth-to-pins efficiency, e.g., total transmitted bandwidth per total number of pins used for communication. In simultaneous bidirectional (SBD) signaling, there are two transceivers, one on each side of each communication channel. A transceiver includes a transmitter and a receiver. Therefore, the total transmitted bandwidth is doubled (due to transmitting and receiving simultaneously) compared to unidirectional signaling and both the bandwidth-to-area efficiency and the bandwidth-to-pins efficiency can be increased.

Since the bandwidth-to-pins efficiency and bandwidth-to-area efficiency are important metrics sought to be minimized, most parallel communication systems (including some SBD communication systems) are often implemented using single-ended signaling. In single-ended signaling, a signal is transmitted over one wire, with another wire used as a ground or reference voltage. The value of the signal is then determined relative to this ground. While the metrics mentioned above are improved by using single-ended signaling, single-ended signaling systems are sensitive to noise (e.g., voltage spikes) and interference over the supply voltage. Furthermore, in parallel interfaces in general and in SBD interfaces in particular, there are many transceivers on each side of an interface that are switching simultaneously and causing large simultaneous switching noise (SSN) that increases the voltage spikes over the supply voltage.

In SBD systems, during the transition from idle mode, which involves transmission of consecutive zeros or consecutive ones, into active (or mission) mode, which involves transmission of live data, the SBD transceivers suffer from large current changes through the power delivery network (PDN) in a short period of time. As a result, there are voltage spikes over the supply voltage, which degrade the system performance.

BRIEF DESCRIPTION OF DRAWINGS

Various embodiments in accordance with the present disclosure will be described with reference to the drawings, in which:

FIG. 4 is a flow chart of a method for two-way encoding within an SBD-based communication system according to various embodiments;

FIG. 5A is a flow chart of a method for two-way encoding within an SBD-based communication system according to at least one embodiment;

FIG. 5B is a flow chart of a method for two-way encoding within an SBD-based communication system according to at least another embodiment; and FIG. 6 is a flow chart of an example method for two-way encoding within an SBD-based communication system according to some embodiments.

DETAILED DESCRIPTION

Figure 1:
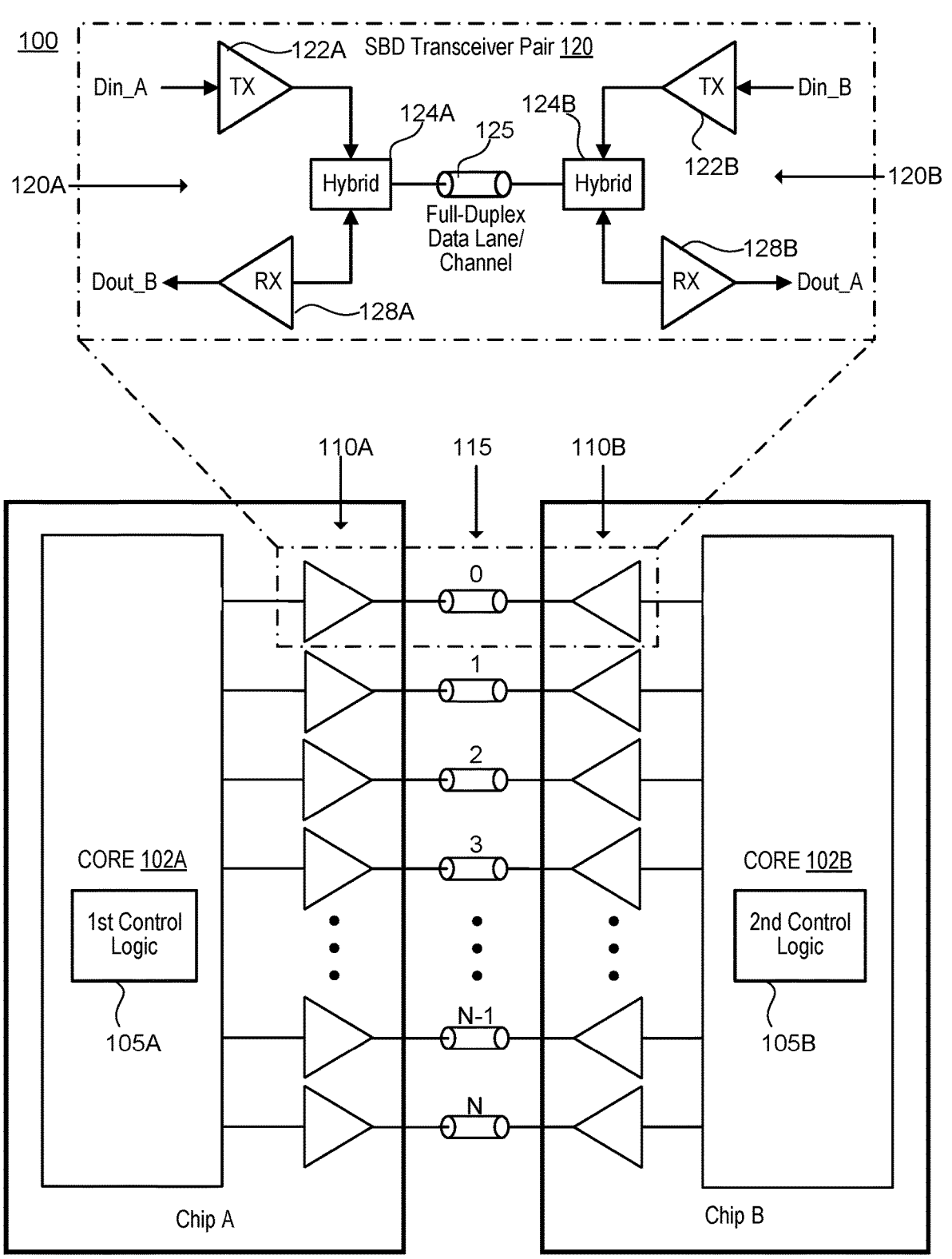
FIG. 1 is a schematic block diagram of an example SBD-based communication system implementing two-way encoding at the processor core level according to various embodiments.

In some implementations of parallel interfaces of communication systems (e.g., across dice or integrated circuit chips), in an attempt to reduce power consumption during data transfer across channels (e.g., external buses running between transceivers), data bus inversion (DBI) is sometimes implemented. As is known, DBI is an encoding technique used for encoding bus transmissions for low-power systems. For example, DBI is based on the fact that a large amount of power is wasted because of transitions (e.g., dynamic power consumption), especially in external buses. Thus, reducing these transitions aids optimization (e.g., reduction) of power dissipation. Such reduction of power dissipation may be performed by introducing an additional signal line (e.g., INV for "inverted") to the bus lines. A signal issued over this signal determines whether or not the other lines should be inverted.

While DBI encoding reduces the dynamic power consumption in a parallel interface system, a large portion of the power consumption in SBD-based systems is static. This static power consumption is due to the hybrid structure in the front-end driver of a transceiver that causes a static current flow between both sides of the bidirectional transceivers when the transceivers are transmitting opposite bits over the same channel. The static current consumption in an SBD system is not reduced by the DBI encoding, and the penalty of the extra line added when using this encoding makes DBI even less attractive for SBD-based communication systems. For example, DBI encoding only reduces the dynamic power consumption, which is not the dominant source of power consumption in an SBD-based system.

Aspects and embodiments of the present disclosure address the above deficiencies with employing SBD-based communication and using DBI encoding by implementing a particular two-way encoding (involving both sides of the transceiver-based interface) regardless of whether the communication system is in idle mode or active mode, which is also referred to as mission mode herein. The disclosed encoding, for example, reduces supply voltage spikes and other noise during switching between modes, which may consequently result in reduced static power dissipation when operating in at least active mode.

In various embodiments, the disclosed encoding takes advantage of the feature, in SBD architecture, that when two SBD transmitters (corresponding transmitters that share the same channel) transmit the opposite bits, there is a static current that flows through the supply network. The disclosed encoding ensures that, during idle mode, more current will be flowing through the power supply compared to functioning without the encoding. When using the encoding during active mode, the average current consumption stays the same compared to functioning without encoding. As a result, during the transition from idle mode to active mode, the current change will be smaller, hence the power supply spike will be smaller as well. As will be illustrated, on average, the current change can be made to be zero, thus eliminating these power supply voltage spikes.

In at least some embodiments, a communication system includes a first plurality of transceivers and first control logic coupled to the first plurality of transceivers. The first control logic can be configured to invert bits transmitted by selected transceivers of the first plurality of transceivers. In these embodiments, the system further includes a second plurality of transceivers coupled in parallel to the first plurality of transceivers over a corresponding plurality of data lanes as simultaneous bidirectional transceivers. The system may further include second control logic coupled to the second plurality of transceivers and configured to invert bits transmitted by selected transceivers of the second plurality of transceivers.

In at least some embodiments, the first and second control logic perform an encoding of bit inversions that causes a first pair of transceivers coupled over a first data lane to transmit non-inverted bits in a first direction and a second direction over the first data lane. In some embodiments, the encoding further causes a second pair of transceivers coupled over a second data lane to transmit inverted bits in a first direction but not a second direction over the second data lane. In some embodiments, the encoding further causes a third pair of transceivers coupled over a third data lane to transmit inverted bits in the second direction but not the first direction over the third data lane. In some embodiments, the encoding further causes a fourth pair of transceivers coupled over a fourth data lane to transmit inverted bits in the first direction and the second direction over the fourth data lane. In various of these embodiments, the first pair of transceivers, the second pair of transceivers, the third pair of transceivers, and the fourth pair of transceivers are not sequentially ordered.

Further, to perform another disclosed encoding according to at least some embodiments, the communication system causes bits to be inverted that are transmitted by odd-numbered transceivers of a first plurality of transceivers of the communication system. The communication system further causes bits to be inverted that are transmitted by odd-numbered transceiver pairs of a second plurality of transceivers that are communicatively coupled in parallel to the first plurality of transceivers over a corresponding plurality of data lanes (e.g., located within external buses) of the communication system. In these embodiments, some of the first and second plurality of transceivers are SBD transceivers, and the odd-numbered transceivers and the odd-numbered transceiver pairs are sequentially indexed from a common starting point.

In at least some alternative embodiments, this encoding may also be performed by changing the inversion of bits to the even-numbered transceivers of the first plurality of transceivers and the even-numbered transceiver pairs of the second plurality of transceivers and achieve the same results. While performing this encoding can be performed in a processing core (or other processing logic) on each chip that forms the parallel interface, the encoding can also be designed into the hardware of the transceivers that line each side of the data lanes. Each of these implementation approaches will be described in more detail.

Therefore, advantages of the receivers, systems, and methods implemented in accordance with some embodiments of the present disclosure include, but are not limited to, the ability to significantly reduce the large supply voltage spikes typically experienced from noise within SBD-based parallel interfaces. These advantages are achievable through a straightforward (and easily-repeatable) encoding that does not require complex hardware. For example, the disclosed encoding approach does not require an extra line or extra transceivers (unlike DBI), resulting in a design that employs less area and fewer pins, making the design cost-effective. Further, although the encoding approach increases power consumption during idle mode operation, this power consumption is usually not a dominant metric, and the encoding enables relaxing design constraints, which by itself can help reduce power consumption during the more dominant power consuming period of active mode operation. Other advantages will be apparent to those skilled in the art of SBD-based transceiver interface design, as will be discussed hereinafter.

FIG. 1 is a schematic block diagram of an example SBD-based communication system 100 implementing two-way encoding at the processor core level according to various embodiments. In various embodiments, the system 100 includes a first integrated circuit (IC) chip or die (e.g., Chip A) and a second IC chip or die (e.g., Chip B). In these embodiments, Chip A includes a first processing core 102A having first control logic 105A, and Chip B includes a second processing core 102B having second control logic 105B. Further, in at least some embodiments, Chip A includes a first plurality of transceivers 110A coupled to the first processing core 102A (and thus to the first control logic 105A), and Chip B includes a second plurality of transceivers 110B coupled to the second processing core 102B (and thus to the second control logic 105B). In some embodiments, although not illustrated, the first control logic 105A is instead located between the first processing core 102A and the first plurality of transceivers 110A, and the second control logic 105B is instead located between the second processing core 102B and the second plurality of transceivers 110B. In some embodiments, one or more of the first processing core 102A, the second processing core 102B, the first IC chip or die (Chip A), and the second IC chip or die (Chip B) are central processing units (CPUs), graphics processing units (GPUs), or data processing units (DPUs).

In various embodiments, the system 100 further includes a plurality of data lanes 115 communicatively coupled between the plurality of first transceivers 110A and the second plurality of transceivers 110B, e.g., and thus between Chip A and Chip B. In some embodiments, a communication interface (or data interface) is formed between Chip A and Chip B by the first and second plurality of transceivers 110A and 110B and the plurality of corresponding data lanes 115. In some embodiments, the plurality of data lanes 115 are also referred to as (or located in) data communication buses or channels. In these embodiments, the second plurality of transceivers 110B are coupled in parallel to the first plurality of transceivers 110A over corresponding data lanes of the plurality of data lanes 115. Due to this coupling over a single data lane, intercoupled transceivers of the first and second plurality of transceivers 110A and 110B are simultaneous bidirectional (SBD) transceivers, which was discussed previously.

In some embodiments, the first control logic 105A is configured to determine and/or generate data to be passed over various ones of the first plurality of transceivers 110A. Similarly, in these embodiments, the second control logic 105B is configured to determine and/or generate data to be passed over various ones of the second plurality of transceivers 110B. In at least some embodiments, the first and second processing cores 102A and 102B control transitions between idle mode and active mode in terms of what data is being transmitted over which transceivers. In certain communication devices and systems, idle mode involves transmitting only ones or only zeros (sometimes referred to as dummy data) over the plurality of data lanes 115. In transitioning to active mode, the first processing core 102A and the second processing core 102B begin to send meaningful data back and forth over the plurality of data lanes 115 via the first and second plurality of transceivers 110A and 110B, respectively. As discussed, these transitions include large, fast changes in current that cause large voltage spikes within the supply voltage of Chip A and Chip B, degrading performance of data communication between Chip A and Chip B.

In these embodiments, because the first and second plurality of transceivers 110A and 110B form SBD transceiver pairs 120, each SBD transceiver pair 120 communicates over a single data lane 125 that constitutes, for example, a full-duplex channel over which data can be concurrently sent and received by either transceiver. For example, each SBD transceiver pair 120 may include a first transceiver 120A coupled to a second transceiver 120B over the data lane 125. In some embodiments, the first transceiver 120A includes a first transmitter 122A that transmits first data (e.g., Din_A received from the first processing core 102A), a first receiver 128A that receives second data (e.g., Dout_B) over the data lane 125 from the second transceiver 120B, and hybrid circuitry 124A coupled between the first transmitter 122A, the data lane 125, and the first receiver 128A. In some embodiments, the hybrid circuitry 124A facilitates the full-duplex nature of data communication between the first and second transceivers 120A and 120B. For example, the hybrid circuitry 124A may cancel out interference of the first data being transmitted by the first transmitter 122A when receiving the second data over the data lane 125, which will be discussed in more detail with reference to FIGS. 2A-2B.

In at least some embodiments, the second transceiver 120B includes a second transmitter 122B that transmits second data (e.g., Din_B received from the second processing core 102B), a second receiver 128B that receives second data (e.g., Dout_A received over the data lane 125 from the first transceiver 120A, and hybrid circuitry 124B coupled between the second transmitter 122B, the data lane 125, and the second receiver 128B. In some embodiments, the hybrid circuitry 124B facilitates the full-duplex nature of data communication between the first and second transceivers 120A and 120B. For example, the hybrid circuitry 124B may cancel out interference of the second data being transmitted by the second transmitter 122B when receiving the first data over the data lane 125, which will be discussed in more detail with reference to FIGS. 2A-2B.

Figure 2A:
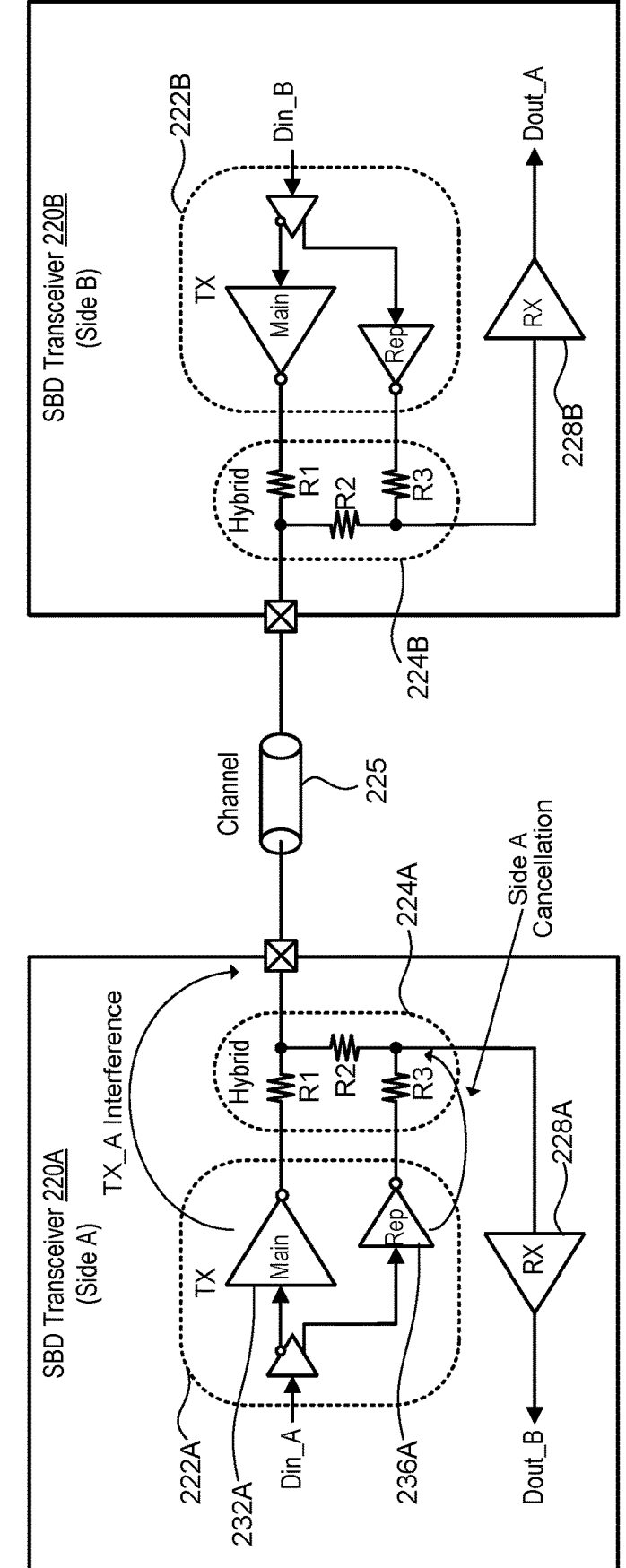
FIG. 2A is a schematic block diagram of an example set of coupled SBD transceivers according to at least some embodiments.

FIG. 2A is a schematic block diagram of an example set of coupled SBD transceivers 200A according to at least some embodiments. In various embodiments, SBD signaling is used in parallel communication systems for reducing the number of channels and increasing bandwidth-to-area efficiency, e.g., total bandwidth of transmitted data divided by the area consumption of the transceivers. Those advantages can be achieved due to this bidirectional architecture, which allows concurrently sending data on both directions of the channels. In some embodiments, the set of coupled SBD transceivers 200A are one of the SBD transceiver pairs 120 illustrated and discussed with reference to FIG. 1.

More specifically, in some embodiments, the set of coupled SBD transceivers 200A includes a first SBD transceiver 220A coupled with a second SBD transceiver 220B over a data lane 225, e.g., a single channel. In some embodiments, the first SBD transceiver 220A includes a first transmitter 222A that transmits a first data signal (e.g., Din_A received from the first processing core 102A), a first receiver 228A that receives a second data signal (e.g., Dout_B) over the data lane 225 from the second transceiver 220B, and first hybrid circuitry 224A coupled between the first transmitter 222A, the data lane 225, and the first receiver 228A. In some embodiments, the second SBD transceiver 220B includes a second transmitter 222B that transmits the second data signal (e.g., Din_B received from the second processing core 102B), a second receiver 228B that receives the first data signal (e.g., Dout_A) over the data lane 225 from the first transceiver 220A, and second hybrid circuitry 224B coupled between the second transmitter 222B, the data lane 225, and the second receiver 228B.

In various embodiments, to send data over both directions of the data lane 225 and allow the correct data to arrive at each receiver input (e.g., input of the first receiver 228A or the second receiver 228B, respectively), each of the first and second SBD transceivers 220A and 220B seeks to cancel transmission of its own data signal, which interferes with receiving the data signal from the oppositely coupled transceiver. To do so, this disclosure explains such cancellation with respect to the first SBD transceiver 220A, but such cancellation scheme is equally applicable to the second SBD transceiver 220B, as will be evident, due to the symmetry of the bi-directional signaling.

For example, in some embodiments, a first main driver 232A of the first transmitter 222A generates the first data signal that is to be transmitted over the data lane 225. In these embodiments, a first replica driver 236A of the first transmitter 22A generates the first data signal, but with an opposite polarity, e.g., generates an inverted first data signal. In illustrated embodiments, each of the first and second hybrid circuitry 224A and 224B includes a series of three transistors, R1, R2, and R3. In an embodiment, in relation to the first SBD transceiver 220A, R1 is coupled between the first main driver 232A and the data lane 225, R2 is coupled between R1 and R3, and R3 is coupled between the first replica driver 236A and the first receiver 228A. In this way, the inverted first data signal that crosses R3 cancels out with the first data signal that crosses R1 with respect to the input to the first receiver 228A.

In some embodiments, this cancellation architecture enables the second data signal being transmitted by the second transmitter 222B to be properly received by the first receiver 228A. While this cancellation architecture of the set of SBD transceivers 200A enables canceling out interfering transmission data signals from the opposing SBD transceiver, this cancellation architecture also wastes static power, generating a constant current flow that does not depend on data transitions during normal operation.

Figure 2B:
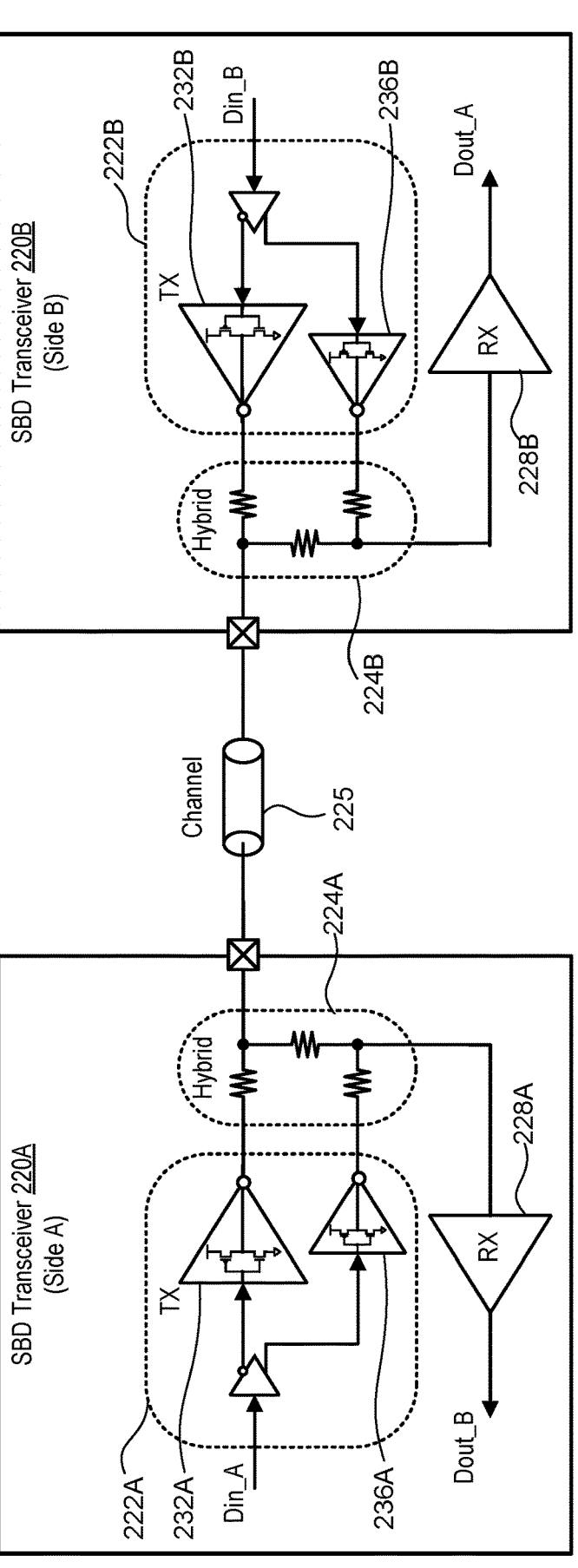
FIG. 2B is a schematic block diagram of an example set of coupled SBD transceivers, implemented with complementary metal-oxide semiconductor (CMOS)-based devices, according to at least some embodiments.

FIG. 2B is a schematic block diagram of an example set of coupled SBD transceivers 200B, implemented with complementary metal-oxide semiconductor (CMOS)-based devices, according to at least some embodiments. In the embodiment of FIG. 2B, the set of coupled SBD transceivers 200B is identical to the set of coupled SBD transceivers 200A of FIG. 2A, except now illustrating a CMOS-based implementation of the first transmitter 222A and the second transmitter 222B. In these embodiments, the second transmitter 222B includes a second main driver 232B and a second replica driver 236B, which function, respectively, symmetrically the same as the first main driver 232A and the first replica driver 236A do in the first transmitter 222A, which were explained with reference to FIG. 2A.

In at least some embodiments, for example, each of the first and second main drivers 232A and 232B and each of the first and second replica drivers 236A and 236B include a coupled pair of PMOS/NMOS transistors, e.g., with the PMOS transistor coupled to the power supply and the NMOS transistor coupled to ground. In these embodiments, gates of the coupled PMOS/NMOS transistors are coupled and receive the input data signal and drains of each transistor being coupled and generate an output data signal.

In the various embodiments discussed herein, the static power consumption by these front-end drivers, e.g., the first and second main drivers 232A and 232B and the first and second replica drivers 236A and 236B, depends on the data being transmitted from the two transmitters 222A and 222B, respectively, on either side of the data lane 225 or channel. In some embodiments in which both transmitters 222A and 222B transmit the same bit polarity (both transmit '0' or both transmit '1' simultaneously), there is a small static current ($I_{small}$) that flows through each main driver, hybrid circuitry, and replica-driver. More specifically, this small static current flows through the first main driver 232A, first hybrid circuitry 224A, and the first replica driver 228A, and the small static current ($I_{small}$) also flows through the second main driver 232B, second hybrid circuitry 224B, and the second replica driver 228B.

In these embodiments, when both the transmitters 222A and 222B transmit the opposite bit polarity, there is a large static current ($I_{large}$) that flows between the two transmitters 222A and 222B through the data lane 225, e.g., from the side with the '1' bit to the side with the '0' bit. In these embodiments during which there is an opposite bit polarity between the SBD transceivers, a medium level of current ($I_{medium}$) also flows through the hybrid circuitry to the replica driver of each SBD transceiver in an opposite direction of the large current. Table 1 illustrates a summary of these currents and when they are expected to flow.

TABLE 1

| Side A | Side B | Current Flow(s) |
|--------|--------|-----------------|
| 0 | 0 | $I_{small}$ |
| 1 | 1 | $I_{small}$ |
| 0 | 1 | $I_{large}$ & $I_{medium}$ |
| 1 | 0 | $I_{large}$ & $I_{medium}$ |

Thus, in various embodiments, during active (or mission) mode, when random data is transmitted on both sides of the data lanes 115 (FIG. 1), there is a 50% chance that the small current ($I_{small}$) current flows in each SBD transceiver 220A and 220B, from the local supply, on each side. Further, there is a 25% chance that a large current ($I_{large}$) flows from the local supply in each SBD transceiver, and there is a 25% chance that a medium current ($I_{medium}$) flows in each SBD transceiver from the local supply. Hence, the average current through each of the local supplies (in a bus transmitting data for N SBD transceivers) during active (or mission) mode may be expressed as:

$$I_{avg,mission} = N \cdot (0.5 \cdot I_{small} + 0.25 \cdot I_{medium} + 0.25 \cdot I_{large}) \qquad (1)$$

In some embodiments, during idle mode operation, assume both sides transmit only consecutive zeros or consecutive ones through all of the transmitters 222A and 222B and the data lanes 225 (e.g., the plurality of data lanes 115 in FIG. 1). Therefore, in idle mode, one can assume there is a 100% chance that $I_{small}$ current will flow from the local supply to the local ground. Hence, the average current through each of the local supplies (in a bus that transmits data to/from N SBD transceivers) during idle mode operation may be expressed as:

$$I_{avg,idle} = N \cdot I_{small} \qquad (2)$$

Since the average front-end static power consumption during idle mode and active (or mission) mode is different, during the transitions from idle mode to active/mission mode and vice versa, an average current change $dI_{avg\_idle \to mission}$ or $dI_{avg\_mission \to idle}$ depends on the direction of the transition, which can be calculated using Equations (1) and (2) above as follows.

$$dI_{avg,idel \to mission} =$$
$$I_{avg,mission} - I_{avg,idle} = N \cdot (0.5 \cdot I_{small} + 0.25 \cdot I_{medium} + 0.25 \cdot I_{large}) -$$
$$N \cdot I_{small} == N(0.25 \cdot I_{large} + 0.25 \cdot I_{medium} - 0.5 \cdot I_{small})$$
$$dI_{avg,idle \to mission} = N(0.25 \cdot I_{large} + 0.25 \cdot I_{medium} - 0.5 \cdot I_{small}) \qquad (3)$$
$$dI_{avg,mission \to idle} = -N(0.25 \cdot I_{large} + 0.25 \cdot I_{medium} - 0.5 \cdot I_{small}) \qquad (4)$$

Since $I_{large} > I_{medium} > I_{small}$ the following can be assumed to be true:

$$|dI_{avg,idle \to mission}| = |dI_{avg,mission \to idle}| > 0$$

In disclosed embodiments, since the transition between the operational modes happens very fast (small dt), the effect of those large changes in current consumption causes a large change in current (dI/dt) over the local voltage supply. As a consequence, large supply spikes occur over the local supply network, which degrades the overall system performance, or alternatively requires spending more power for maintaining the same performance, which by itself causes larger dI/dt.

In alternative embodiments, during idle mode operation, it is also possible for one side (e.g., Side A) to transmit all zeros and another side (e.g., Side B) to transmit all ones, causing the large current and medium current to flow, as was discussed previously. Thus, the current transitions in and out of active/mission mode may also differ. The current flowing through each of the sides can be expressed without loss of generality as:

$$I_{avg,idle,side A} = N \cdot I_{medium} \qquad (5)$$

$$I_{avg,idle,side B} = N \cdot I_{large} \qquad (6)$$

The current change between the modes may be expressed as:

$$dI_{avg,idle\leftrightarrow mission,side\ A} = \pm N(0.25 \cdot I_{large} + 0.5 \cdot I_{small} - 0.75 \cdot I_{medium}) \quad (7)$$

$$dI_{avg,idle\leftrightarrow mission,side\ B} = \pm N(0.25 \cdot I_{medium} + 0.5 \cdot I_{small} - 0.75 \cdot I_{large}) \quad (8)$$

In these embodiments, in most cases (except when $0.25 \cdot I_{large} + 0.5 \cdot I_{small} - 0.75 \cdot I_{medium} = 0$): $|dI_{avg,idle\leftrightarrow mission,side\ A}| > 0$ and in all cases, since $I_{large} > I_{medium} > I_{small}$, $|dI_{avg,idle\leftrightarrow mission,side\ B}| > 0$.

With additional reference to FIG. 1, to significantly reduce the voltage spikes in the supply voltage caused by the large current changes during operational mode transitions, the system 100 may implement a two-way encoding of data regardless of whether the system 100 is in idle mode or active/mission mode. The disclosed encoding, for example, reduces supply voltage spikes and other noise during switching between modes, which may consequently result in reduced static power dissipation when operating in active mode.

In some embodiments, the first control logic 105A inverts bits transmitted by odd-numbered transceivers of the first plurality of transceivers 110A (on Side A). The plurality of data lanes 115 have been numbered as 0, 1, 2, 3, . . . N−1, N, to illustrate that numbering can be understood to start from zero ("0"), and the corresponding numbering applies to the first and second plurality of transceivers 110A and 110B, which are mutually coupled across these respective data lanes. In some embodiments, inverting these bits is to invert bits transmitted only by the odd-numbered transceivers and thus not by the even-numbered transceivers.

TABLE 2

| No. | Side A | Side B |
|-----|--------|--------|
| 0 | Not Invert | Not Invert |
| 1 | Invert | Not Invert |
| 2 | Not Invert | Invert |
| 3 | Invert | Invert |

In various embodiments, the second control logic 105B inverts bits transmitted by odd-numbered transceiver pairs of the second plurality of transceivers 110B (on Side B). In some embodiments, inverting these bits is to invert bits transmitted only by the odd-numbered transceiver pairs and thus not by the even-numbered transceiver pairs. In these embodiments, the odd-numbered transceivers and the odd-numbered transceiver pairs are sequentially indexed from a common starting point, e.g., from the zero$^{th}$ data lane in the illustrated example, as summarized in Table 2. Thus, the number associated with a given SBD transceiver in this encoding scheme may be understood as a type of index that depends on a sequential location within a series of sequentially numbered transceivers coupled to a correspondingly numbered data lane of the plurality of data lanes 115. In some embodiments, Side A and Side B in Table 2 are swapped, so specific identification of a particular side is unimportant.

In these embodiments, the odd-numbered transceivers (of the first plurality of transceivers 110A) are numbered 1 and 3, while the odd-numbered transceiver pairs (of the second plurality of transceivers 110B) are those labeled as 2 and 3 because the zeroth transceiver pair are those labeled as 0 and 1. This encoding may be replicated every four data lanes of the plurality of data lanes 115, making implementation straightforward and repeatable.

In alternative embodiments, first control logic 105A inverts bits transmitted by even-numbered transceivers of the first plurality of transceivers 110A (on Side A) and the second control logic 105B inverts bits transmitted by even-numbered transceiver pairs of the second plurality of transceivers 110B (on Side B). In some embodiments, inverting these bits is to invert bits transmitted only by the even-numbered transceivers and thus not by the odd-numbered transceivers. In some embodiments, inverting these bits is to invert bits transmitted only by the even-numbered transceiver pairs and thus not by the odd-numbered transceiver pairs.

TABLE 3

| No. | Side A | Side B |
|-----|--------|--------|
| 0 | Invert | Invert |
| 1 | Not Invert | Invert |
| 2 | Invert | Not Invert |
| 3 | Not Invert | Not Invert |

In various embodiments, the even-numbered transceivers and the even-numbered transceiver pairs are sequentially indexed from a common starting point, e.g., from the zeroth data lane in the illustrated example, as summarized in Table 3. In this way, a similar encoding is performed but causes inversion to occur on the even-numbered transceivers of the first plurality of transceivers 110A and the even-numbered transceiver pairs of the plurality of second transceivers 110B. This encoding may also be replicated every four data lanes of the plurality of data lanes 115, making implementation straightforward and repeatable. In some embodiments, Side A and Side B in Table 2 are swapped, so specific identification of a particular side is unimportant.

In various embodiments, the encoding can be expanded so as to be similar to, but not exactly the encoding illustrated in Tables 2-3. For example, Tables 4-11 illustrate additional possible encoding schemes that may similarly be repeated across a series of data lanes by intercoupled series of transceivers, whether via control logic (FIG. 1) or hardware (e.g., implementations similar to FIGS. 3A-3B). Again, Side A and Side B may be swapped in any of these Tables illustrating potential encodings. Additional such encoding schemes with different mixtures of inversion/non-inversion are envisioned, where the average current consumption remains the same.

TABLE 4

| No. | Side A | Side B |
|-----|--------|--------|
| 0 | Not Invert | Not Invert |
| 1 | Invert | Not Invert |
| 2 | Invert | Invert |
| 3 | Not Invert | Invert |

TABLE 5

| No. | Side A | Side B |
|-----|--------|--------|
| 0 | Not Invert | Not Invert |
| 1 | Invert | Invert |
| 2 | Invert | Not Invert |
| 3 | Not Invert | Invert |

TABLE 6

| No. | Side A | Side B |
|-----|--------|--------|
| 0 | Not Invert | Invert |
| 1 | Invert | Invert |
| 2 | Not Invert | Not Invert |
| 3 | Invert | Not Invert |

TABLE 7

| No. | Side A | Side B |
|-----|--------|--------|
| 0 | Not Invert | Invert |
| 1 | Not Invert | Not Invert |
| 2 | Invert | Invert |
| 3 | Invert | Not Invert |

TABLE 8

| No. | Side A | Side B |
|-----|--------|--------|
| 0 | Not Invert | Invert |
| 1 | Not Invert | Not Invert |
| 2 | Invert | Not Invert |
| 3 | Invert | Invert |

TABLE 9

| No. | Side A | Side B |
|-----|--------|--------|
| 0 | Not Invert | Invert |
| 1 | Invert | Invert |
| 2 | Invert | Not Invert |
| 3 | Not Invert | Not Invert |

TABLE 10

| No. | Side A | Side B |
|-----|--------|--------|
| 0 | Not Invert | Invert |
| 1 | Invert | Not Invert |
| 2 | Invert | Invert |
| 3 | Not Invert | Not Invert |

TABLE 11

| No. | Side A | Side B |
|-----|--------|--------|
| 0 | Invert | Invert |
| 1 | Not Invert | Not Invert |
| 2 | Invert | Not Invert |
| 3 | Not Invert | Invert |

More generally, the first control logic 105A and the second control logic 105B can be configured to perform an encoding of bit inversions. In other embodiments, the transceivers themselves are adapted with such encodings, as illustrated by way of example only in FIGS. 3A-3B. In at least some embodiments, the encoding causes a first pair of transceivers coupled over a first data lane to transmit non-inverted bits in a first direction and a second direction over the first data lane. The encoding may further cause a second pair of transceivers coupled over a second data lane to transmit inverted bits in a first direction but not a second direction over the second data lane. The encoding may further cause a third pair of transceivers coupled over a third data lane to transmit inverted bits in the second direction but not the first direction over the third data lane. The encoding may further cause a fourth pair of transceivers coupled over a fourth data lane to transmit inverted bits in the first direction and the second direction over the fourth data lane. In various embodiments, the first pair of transceivers, the second pair of transceivers, the third pair of transceivers, and the fourth pair of transceivers are not sequentially ordered.

In some embodiments, the encoding of the bit inversions is repeated for every four data lanes of the corresponding plurality of data lanes regardless of whether the first control logic 105A and the second control logic 105B are in idle mode or active mode. In some embodiments, the first control logic 105A and the second control logic 105B further perform data bus inversion (DBI) on bits transmitted across the corresponding plurality of data lanes, e.g., in addition to any of the encoding discussed herein.

In various embodiments, the disclosed encoding ensures that, during idle mode, all four possible combinations of transmitted signals through the drivers of the transmitters from both sides (pairs of SBD transceivers that share the same data lane or channel) are distributed evenly in the bus. Consequently, the average current flowing through the voltage supply during idle mode can be expressed as:

$$I_{avg,idle(w/Encoding)} = N \cdot (0.5 \cdot I_{small} + 0.25 \cdot I_{medium} + 0.25 \cdot I_{large}) \qquad (9)$$

In these embodiments, during active or mission mode, the data transmitted by each SBD transceiver is random. Hence, the disclosed encoding does not change the probabilities of particular current expressed in Equation (1). Since the average front-end static power consumption during idle mode and active/mission mode is the same while using the encoding, Equations (1) and (9), during the transitions from idle mode to active/mission and vice versa, there will be no average current change. More specifically, with the disclosed encoding: $dI_{avg}/dt=0$ during the transitions between idle mode and active (or mission) mode. In this way, in the disclosed embodiments, the disclosed encoding (Tables 2-3) may eliminate the supply spikes over the local supply network due to the static power consumption through the SBD front-end drivers. Furthermore, for dynamic power reduction purposes, this encoding can be combined with other types of encodings like DBI, without affecting performance of the system 100. For example, in some embodiments, the encoding also includes performing data bus inversion (DBI) on bits transmitted across a series of data lanes that couples transceivers undergoing any of the disclosed encoding.

Figure 3A:
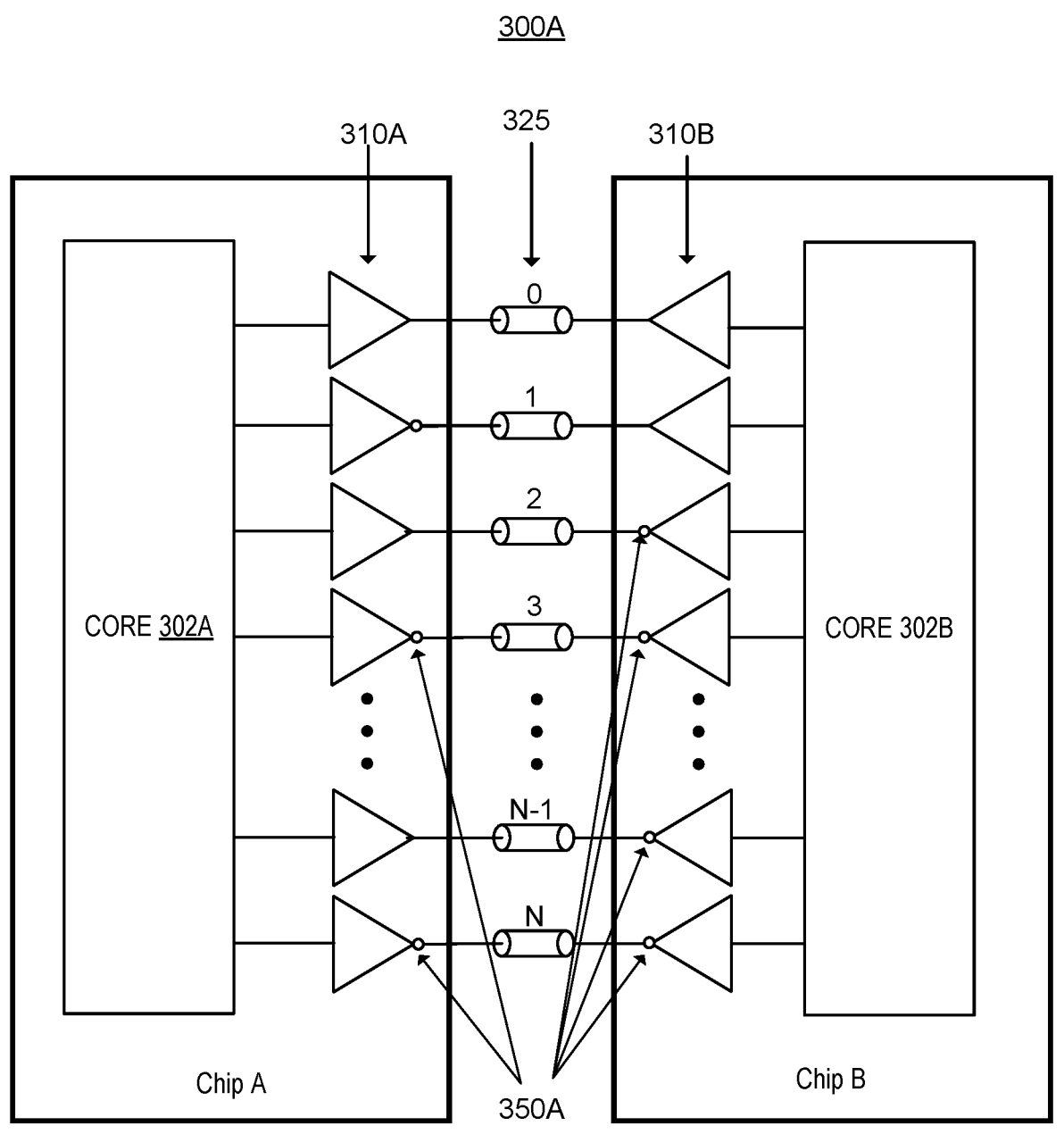
FIG. 3A is a schematic block diagram of an SBD-based communication system implementing two-way encoding of data at the transceiver level according to an exemplary embodiment.

FIG. 3A is a schematic block diagram of an SBD-based communication system 300A implementing two-way encoding of data at the transceiver level according to an exemplary embodiment. In some embodiments, instead of implementing the disclosed encoding within the first and second control logic 105A and 105B (FIG. 1), the disclosed encoding is instantiated directly within a first plurality of transceivers 310A and a second plurality of transceivers 310B coupled together via a plurality of data lanes 325. In these embodiments, the first plurality of transceivers 310A are coupled to a processing core 302A within Chip A, and the second plurality of transceivers 310B are coupled to a processing core 302B within Chip B.

More specifically, in at least one embodiment, the inversion encoding of Table 2 is implemented by adding an inverter 350A (or other inversion hardware) to the odd-numbered transceivers (e.g., numbered 1, 3, 5, . . . N) of the first plurality of transceivers 310A and to the odd-numbered transceiver pairs (e.g., numbered 2, 3, 6, 7, . . . N–1, N) of the second plurality of transceivers 310B. In these embodiments, this inversion hardware can be applied to however many number of transceivers are coupled to each other in the interface between Chips A and B.

Figure 3B:
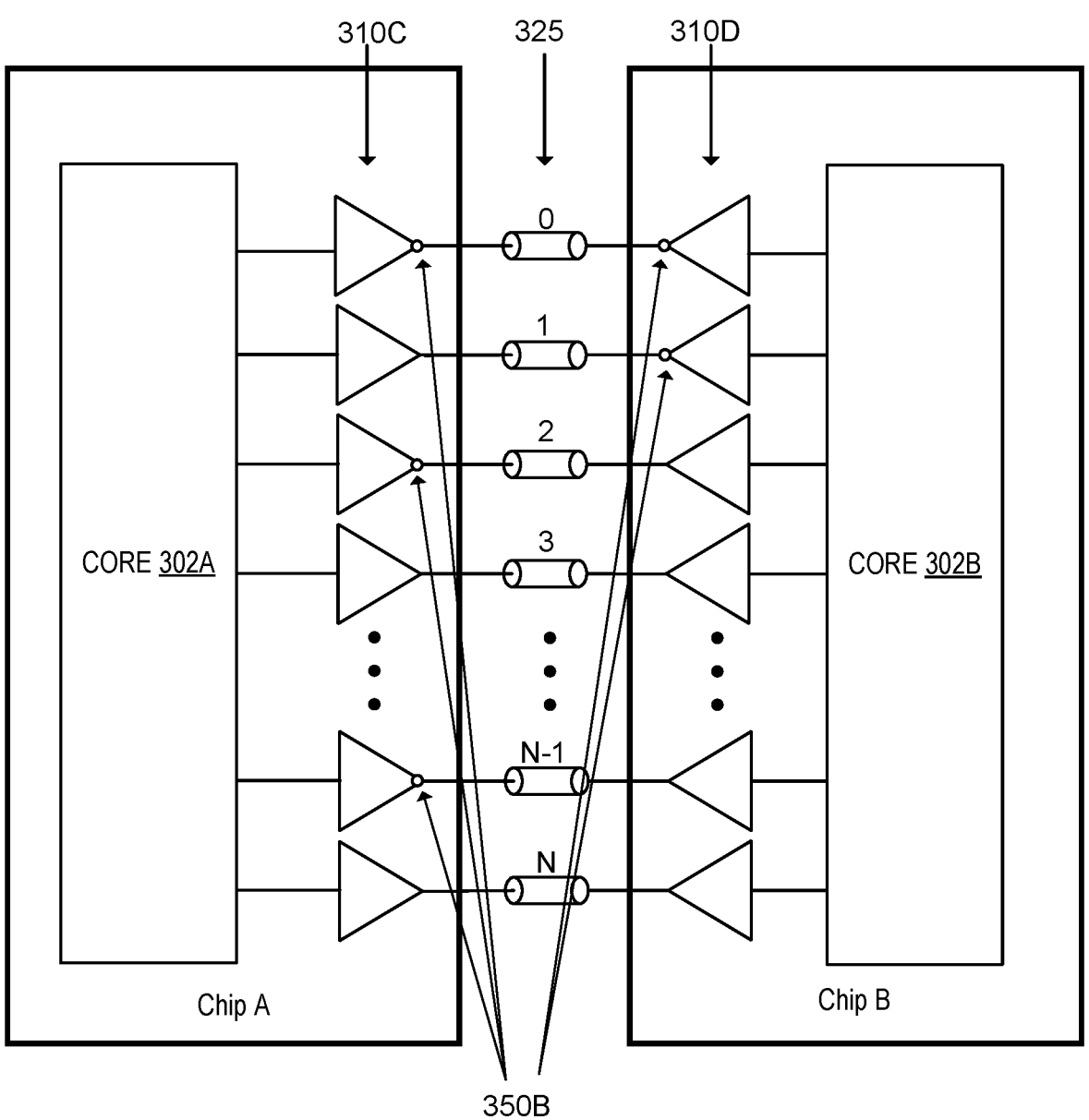
FIG. 3B is a schematic block diagram of an SBD-based communication system implementing two-way encoding of data at the transceiver level according to another exemplary embodiment.

FIG. 3B is a schematic block diagram of an SBD-based communication system 300B implementing two-way encoding of data at the transceiver level according to another exemplary embodiment. In some embodiments, instead of implementing the disclosed encoding within the first and second control logic 105A and 105B (FIG. 1), the disclosed encoding is instantiated directly within a first plurality of transceivers 310C and a second plurality of transceivers 310D coupled together via the plurality of data lanes 325. In these embodiments, the first plurality of transceivers 310C are coupled to the processing core 302A within Chip A and the second plurality of transceivers 310D are coupled to the processing core 302B within Chip B.

More specifically, in at least one embodiment, the inversion encoding of Table 3 is implemented by adding an inverter 350B (or other inversion hardware) to the even-numbered transceivers (e.g., numbered 0, 2, 4, . . . N–1) of the first plurality of transceivers 310C and the odd-numbered transceiver pairs (e.g., numbered 0, 1, 4, 5, . . . ) of the second plurality of transceivers 310B. In these embodiments, this inversion hardware can be applied to however many number of transceivers are coupled to each other in the interface between Chips A and B.

FIG. 4 is a flow chart of a method for two-way encoding within an SBD-based communication system according to various embodiments. The method 400 can be performed by processing logic comprising hardware, software, firmware, or any combination thereof. For example, the method 400 can be performed by control logic on each side of an SBD-based parallel interface (see FIG. 1) or by hardware integrated within transceivers on either side of the SBD-based parallel interface (see FIGS. 3A-3B). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic causes a first pair of transceivers coupled over a first data lane to transmit non-inverted bits in a first direction and a second direction over the first data lane.

At operation 420, the processing logic further causes a second pair of transceivers coupled over a second data lane to transmit inverted bits in a first direction but not a second direction over the second data lane.

At operation 430, the processing logic further causes a third pair of transceivers coupled over a third data lane to transmit inverted bits in the second direction but not the first direction over the third data lane.

At operation 440, the processing logic further causes a fourth pair of transceivers coupled over a fourth data lane to transmit inverted bits in the first direction and the second direction over the fourth data lane.

In various embodiments of the method 400, the first pair of transceivers, the second pair of transceivers, the third pair of transceivers, and the fourth pair of transceivers are not sequentially ordered, e.g., making possible any encoding of any of Tables 2-11 (or corresponding encoding) described herein. In some embodiments, the encoding of the bit inversions is repeated for every four data lanes of the corresponding plurality of data lanes regardless of whether the first control logic 105A and the second control logic 105B are in idle mode or active mode. In some embodiments, the first control logic 105A and the second control logic 105B further perform data bus inversion (DBI) on bits transmitted across the corresponding plurality of data lanes, e.g., in addition to any of the encoding discussed herein.

FIG. 5A is a flow chart of a method 500A for two-way encoding within an SBD-based communication system according to at least one embodiment. The method 500A can be performed by processing logic comprising hardware, software, firmware, or any combination thereof. For example, the method 500A can be performed by control logic on each side of an SBD-based parallel interface (see FIG. 1) or by hardware integrated within transceivers on either side of the SBD-based parallel interface (see FIGS. 3A-3B). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic causes bits to be inverted that are transmitted by odd-numbered transceivers of a first plurality of transceivers of a communication system. In some embodiments, the processing logic also determines the odd-numbered transceivers by sequentially counting the first plurality of transceivers from a common starting point.

At operation 520, the processing logic causes bits to be inverted that are transmitted by odd-numbered transceiver pairs of a second plurality of transceivers that are coupled in parallel to the first plurality of transceivers over a corresponding plurality of data lanes of the communication system. In some embodiments, the processing logic also determines the odd-numbered transceiver pairs by sequentially counting adjacent pairs of the second plurality of transceivers from the common starting point. Table 2 summarizes the inversion encoding of the method 500A.

In various embodiments, ones of the first and second plurality of transceivers are simultaneous bidirectional transceivers. In at least some embodiments, the odd-numbered transceivers and the odd-numbered transceiver pairs are sequentially indexed from the common starting point, e.g., a first or zeroth transceiver of each of the first and second plurality of transceivers.

FIG. 5B is a flow chart of a method 500B for two-way encoding within an SBD-based communication system according to at least another embodiment. The method 500A can be performed by processing logic comprising hardware, software, firmware, or any combination thereof. For example, the method 500A can be performed by control logic on each side of an SBD-based parallel interface (see FIG. 1) or by hardware integrated within transceivers on either side of the SBD-based parallel interface (see FIGS. 3A-3B). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 530, the processing logic causes bits to be inverted that are transmitted by even-numbered transceivers of a first plurality of transceivers of a communication system. In some embodiments, the processing logic also determines the even-numbered transceivers by sequentially counting the first plurality of transceivers from a common starting point.

At operation 540, the processing logic causes bits to be inverted that are transmitted by even-numbered transceiver pairs of a second plurality of transceivers that are coupled in parallel to the first plurality of transceivers over a corresponding plurality of data lanes of the communication system. In some embodiments, the processing logic also determines the even-numbered transceiver pairs by sequentially counting adjacent pairs of the second plurality of transceivers from the common starting point. Table 3 summarizes the inversion encoding of the method 500B.

In various embodiments, ones of the first and second plurality of transceivers are simultaneous bidirectional transceivers. In at least some embodiments, the even-numbered transceivers and the even-numbered transceiver pairs are sequentially indexed from the common starting point, e.g., a first or zeroth transceiver of each of the first and second plurality of transceivers.

FIG. 6 is a flow chart of an example method 600 for two-way encoding within an SBD-based communication system according to some embodiments. The method 600 can be performed by processing logic comprising hardware, software, firmware, or any combination thereof. For example, the method 600 can be performed by control logic on each side of an SBD-based parallel interface (see FIG. 1) or by hardware integrated within transceivers on either side of the SBD-based parallel interface (see FIGS. 3A-3B). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic causes non-inverted bits to be transmitted between a first transceiver and a second transceiver that are intercoupled over a first data lane of a series of data lanes of a communication system.

At operation 620, the processing logic causes inverted bits to be transmitted by a third transceiver and non-inverted bits to be transmitted by a fourth transceiver, wherein the third transceiver and the fourth transceiver are intercoupled over a second data lane of the series of data lanes.

At operation 630, the processing logic causes non-inverted bits to be transmitted by a fifth transceiver and inverted bits to be transmitted by a sixth transceiver, wherein the fifth transceiver and the sixth transceiver are intercoupled over a third data lane of the series of data lanes.

At operation 640, the processing logic causes inverted bits to be transmitted between a seventh transceiver and an eighth transceiver that are intercoupled over a fourth data lane of the series of data lanes, wherein the first, second, third, and fourth data lanes are sequentially indexed from the first data lane and interconnect a corresponding series of simultaneous-bidirectional transceivers.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A communication system comprising:
a first plurality of transceivers;
first control logic coupled to the first plurality of transceivers and configured to invert bits transmitted by selected transceivers of the first plurality of transceivers;
a second plurality of transceivers coupled in parallel to the first plurality of transceivers over a corresponding plurality of data lanes, wherein ones of the first and second plurality of transceivers are simultaneous bidirectional transceivers; and second control logic coupled to the second plurality of transceivers and configured to invert bits transmitted by selected transceivers of the second plurality of transceivers, wherein an encoding of bit inversions by the first and second control logic causes:

a first pair of transceivers coupled over a first data lane to transmit non-inverted bits in a first direction and a second direction over the first data lane;

a second pair of transceivers coupled over a second data lane to transmit inverted bits in a first direction but not a second direction over the second data lane;

a third pair of transceivers coupled over a third data lane to transmit inverted bits in the second direction but not the first direction over the third data lane; and a fourth pair of transceivers coupled over a fourth data lane to transmit inverted bits in the first direction and the second direction over the fourth data lane.

2. The communication system of claim 1, wherein the first pair of transceivers, the second pair of transceivers, the third pair of transceivers, and the fourth pair of transceivers are not sequentially ordered.

3. The communication system of claim 1, wherein the encoding of the bit inversions is repeated for every four data lanes of the corresponding plurality of data lanes regardless of whether the first control logic and the second control logic are in idle mode or active mode.

4. The communication system of claim 1, wherein the first control logic and the second control logic are further to perform data bus inversion (DBI) on bits transmitted across the corresponding plurality of data lanes.

5. The communication system of claim 1, further comprising the corresponding plurality of data lanes.

6. The communication system of claim 1, further comprising:

a first processing core comprising the first control logic, the first processing core to cause the first plurality of transceivers to transition between an idle mode and an active mode; and a second processing core comprising the second control logic, the second processing core to cause the second plurality of transceivers to transition between the idle mode and the active mode.

7. The communication system of claim 1, wherein the first control logic is coupled between a first processing core of a first integrated circuit and the first plurality of transceivers, and wherein the second control logic is coupled between a second processing core of a second integrated circuit and the second plurality of transceivers.

8. A communication system comprising:

a first plurality of transceivers;

first control logic coupled to the first plurality of transceivers and to invert bits transmitted by only odd-numbered transceivers of the first plurality of transceivers regardless of whether the first plurality of transceivers is in idle mode or active mode;

a second plurality of transceivers coupled in parallel to the first plurality of transceivers over a corresponding plurality of data lanes, wherein ones of the first and second plurality of transceivers are simultaneous bidirectional transceivers; and second control logic coupled to the second plurality of transceivers and to invert bits transmitted by odd-numbered transceiver pairs of the second plurality of transceivers, wherein the odd-numbered transceivers and the odd-numbered transceiver pairs are sequentially indexed from a common starting point.

9. The communication system of claim 8, wherein the second control logic is to invert the bits transmitted by only the odd-numbered transceiver pairs regardless of whether the second plurality of transceivers is in idle mode or active mode.

10. The communication system of claim 8, wherein the first control logic is further to determine the odd-numbered transceivers by sequentially counting the first plurality of transceivers from the common starting point.

11. The communication system of claim 8, wherein the second control logic is further to determine the odd-numbered transceiver pairs by sequentially counting adjacent pairs of the second plurality of transceivers from the common starting point.

12. The communication system of claim 8, further comprising:

a first integrated circuit (IC) chip or die comprising the first processing core and the first plurality of transceivers;

a second IC chip or die comprising the second processing core and the second plurality of transceivers; and the plurality of data lanes communicatively coupled between respective ones of the first plurality of transceivers and the second plurality of transceivers.

13. A communication system comprising:

a first plurality of transceivers;

a first processing core comprising first control logic coupled to the first plurality of transceivers, the first control logic to invert bits transmitted by even-numbered transceivers of the first plurality of transceivers;

a second plurality of transceivers coupled in parallel to the first plurality of transceivers over a corresponding plurality of data lanes, wherein ones of the first and second plurality of transceivers are simultaneous bidirectional transceivers; and a second processing core comprising second control logic coupled to the second plurality of transceivers, the second control logic to invert bits transmitted by only even-numbered transceiver pairs of the second plurality of transceivers regardless of whether the second plurality of transceivers is in idle mode or active mode, wherein the even-numbered transceivers and the even-numbered transceiver pairs are sequentially indexed from a common starting point.

14. The communication system of claim 13, wherein the first control logic is to invert the bits transmitted by only the even-numbered transceivers regardless of whether the first plurality of transceivers is in idle mode or active mode.

15. The communication system of claim 13, wherein the first control logic is further to determine the even-numbered transceivers by sequentially counting the first plurality of transceivers from the common starting point.

16. The communication system of claim 13, wherein the second control logic is further to determine the even-numbered transceiver pairs by sequentially counting adjacent pairs of the second plurality of transceivers from the common starting point.

17. A method comprising:

only causing bits to be inverted that are transmitted by odd-numbered transceivers, of a first plurality of transceivers of a communication system, regardless of whether the first plurality of transceivers is in idle mode or active mode; and causing bits to be inverted that are transmitted by odd-numbered transceiver pairs of a second plurality of transceivers that are coupled in parallel to the first plurality of transceivers over a corresponding plurality of data lanes of the communication system, wherein ones of the first and second plurality of transceivers are simultaneous bidirectional transceivers, and wherein the odd-numbered transceivers and the odd-numbered transceiver pairs are sequentially indexed from a common starting point.

18. The method of claim 17, wherein causing the bits to be inverted that are transmitted by the odd-numbered transceiver pairs comprises only causing the bits to be inverted that are transmitted by the odd-numbered transceiver pairs of the second plurality of transceivers regardless of whether the second plurality of transceivers is in idle mode or active mode.

19. The method of claim 17, further comprising:

causing the first plurality of transceivers to transition between an idle mode and an active mode; and causing the second plurality of transceivers to transition between the idle mode and the active mode.

20. The method of claim 17, further comprising:

determining the odd-numbered transceivers by sequentially counting the first plurality of transceivers from the common starting point; and determining the odd-numbered transceiver pairs by sequentially counting adjacent pairs of the second plurality of transceivers from the common starting point.

21. A method comprising:

causing non-inverted bits to be transmitted between a first transceiver and a second transceiver that are intercoupled over a first data lane of a series of data lanes of a communication system;

causing inverted bits to be transmitted by a third transceiver and non-inverted bits to be transmitted by a fourth transceiver, wherein the third transceiver and the fourth transceiver are intercoupled over a second data lane of the series of data lanes;

causing non-inverted bits to be transmitted by a fifth transceiver and inverted bits to be transmitted by a sixth transceiver, wherein the fifth transceiver and the sixth transceiver are intercoupled over a third data lane of the series of data lanes; and causing inverted bits to be transmitted between a seventh transceiver and an eighth transceiver that are intercoupled over a fourth data lane of the series of data lanes, wherein the first, second, third, and fourth data lanes interconnect a corresponding series of simultaneous-bidirectional transceivers.

* * * * *